United States Patent
Xie et al.

(10) Patent No.: US 11,119,893 B2
(45) Date of Patent: Sep. 14, 2021

(54) COMPUTING SYSTEM WITH WIRELESS DEBUG CODE OUTPUT

(71) Applicant: ADVANCED MICRO DEVICES, INC., Santa Clara, CA (US)

(72) Inventors: Shiqun Xie, Sunnyvale, CA (US); Donald L. Cheung, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 14/861,195

(22) Filed: Sep. 22, 2015

(65) Prior Publication Data

US 2017/0083427 A1 Mar. 23, 2017

(51) Int. Cl.
*G06F 9/44* (2018.01)
*G06F 11/36* (2006.01)

(52) U.S. Cl.
CPC .................. *G06F 11/366* (2013.01)

(58) Field of Classification Search
CPC ....................................... G06F 11/366
USPC .................................. 717/124–130
See application file for complete search history.

(56) References Cited

U.S. PATENT DOCUMENTS

| | | | | |
|---|---|---|---|---|
| 6,487,683 B1 * | 11/2002 | Edwards | ............. | G06F 11/3648 714/31 |
| 7,243,043 B2 * | 7/2007 | Shin | ..................... | G06F 11/2221 702/182 |
| 7,657,807 B1 * | 2/2010 | Watkins | ......... | G01R 31/318594 714/718 |
| 7,721,260 B2 * | 5/2010 | Short | ................... | G06F 11/2236 717/124 |
| 7,779,238 B2 * | 8/2010 | Kosche | ............... | G06F 11/3466 712/227 |
| 2002/0133794 A1 * | 9/2002 | Kanapathippillai | ......................... | G01R 31/31705 716/136 |
| 2005/0183069 A1 * | 8/2005 | Cepulis | ............... | G06F 11/3636 717/128 |
| 2006/0146622 A1 * | 7/2006 | Mukherjee | ....... | G01R 31/31724 365/201 |
| 2007/0226702 A1 * | 9/2007 | Segger | ................ | G06F 11/3624 717/130 |
| 2019/0205244 A1 * | 7/2019 | Smith | .................... | G06F 3/0613 |

OTHER PUBLICATIONS

Wikipedia; *Memory-mapped I/O*; https://en.wikipedia.org/wiki/Memorymapped_I/O; Mar. 18, 2015; pp. 1-6.
PC Magazine Encyclopedia; *PC I/O addressing Definition from PC Magazine Encyclopedia*; http://www.pcmag.com/encyclopedia/term/48942/pcioaddressing; Mar. 18, 2015; pp. 1-3.

(Continued)

*Primary Examiner* — Chuck O Kendall

(57) ABSTRACT

Various computing systems and methods of using the same are disclosed. In one aspect, a computing system is provided that includes a semiconductor chip that is operable to execute start up self test code. An encoder is operable to encode the progress of the execution of the start up self test code to generate encoded debug code. Also included is means for wirelessly outputting the encoded debug code from the computing system.

21 Claims, 5 Drawing Sheets

(56) References Cited

OTHER PUBLICATIONS

PC Magazine Encyclopedia; *POST code Definition from PC Magazine Encyclopedia*; http://www.pcmag.com/encyclopedia/term/49544/postcode; Mar. 18, 2015; pp. 1-3.
Wikipedia; *Power-on self-test*; https://en.wikipedia.org/wiki/Poweron_selftest#Error_reporting; Mar. 18, 2015; pp. 1-12.
PC Magazine Encyclopedia; *TCP/IP port Definition from PC Magazine Encyclopedia*; http://www.pcmag.com/encyclopedia/term/52617/tcpipport; Mar. 18, 2015; pp. 1-3.

* cited by examiner

# COMPUTING SYSTEM WITH WIRELESS DEBUG CODE OUTPUT

BACKGROUND OF THE INVENTION

1. Field of the Invention

This invention relates generally to computing systems, and more particularly to computing system debug code retrieval.

2. Description of the Related Art

Many types of modern computers perform a power-on self-test or POST immediately after being powered on. In a typical POST, the computer's processor executes a series of instructions to initialize various on-board devices and peripherals, monitor the status of various components of the system and perform other functions. These instructions are executed prior to the booting and loading of an operating system by the computer. The results of the tests run by the POST instructions are sometimes displayed on a panel that is part of a computer system, output to an external device or stored on-board for future retrieval by some diagnostic tool or another.

The process of debugging a computer that fails to boot typically involves examining either specific error audible beeps generated during POST or gaining access to the internals of the computer system to examine where in the POST process the boot process failed. The difficulty faced by service center engineers or other technicians in trying to determine the causes for a particular computer boot failure is that in most instances, the computer system will have to be manually opened up and some form of specialized diagnostic card inserted into an available system board slot such as a mini-PCI express (PCIe) slot. Once the diagnostic card is seated in the mini-PCIe slot, the computer is turned on so that the diagnostic card can attempt to read the debugging information that the POST process generates. This can be an ungainly process, particularly where large numbers of failing computer systems have been returned and required debugging.

In some conventional systems, debugging code is broadcast by way of I/O port 80. Conventional I/O port 80 post code interfaces are typically multiple signal parallel outputs that in many conventional systems are delivered to a PCI bus or low pin count bus and ultimately to a mini-PCIe slot.

Samsung proposed a 1-pin port 80 post code debug system in which an encoded debug signal is sent from a system processor by way of a general purpose I/O to a VGA port. The VGA port can then be used with a male VGA connector and cable to connect to an external debugging card in order to read the debugging code. Intel Corporation has also proposed a 1-pin system to deliver pre-boot debugging code to a hardwired output of a computer system.

The present invention is directed to overcoming or reducing the effects of one or more of the foregoing disadvantages.

SUMMARY OF THE INVENTION

In accordance with one aspect of the present invention, a computing system is provided that includes a semiconductor chip that is operable to execute start up self test code. An encoder is operable to encode the progress of the execution of the start up self test code to generate encoded debug code. Also included is means for wirelessly outputting the encoded debug code from the computing system.

In accordance with another aspect of the present invention, a semiconductor chip is provided that includes logic that is operable to execute start up self test code, and an encoder that is operable to encode the progress of the execution of the start up self test code to generate encoded debug code. The chip also includes a transmitter for wirelessly outputting the encoded debug code from the semiconductor chip.

In accordance with another aspect of the present invention, a method of conveying start up self test debug code from a computing system that has a semiconductor chip is provided. The method includes using the semiconductor chip of the computing system to execute the start up self test code, and encoding the progress of the execution of the start up self test code to generate encoded debug code. The encoded debug code is wirelessly outputted from the computing system.

In accordance with another aspect of the present invention, a computing system is provided that includes a semiconductor chip that is operable to execute start up self test code. An encoder is operable to encode the progress of the execution of the start up self test code to generate encoded debug code. A USB port is connected to the semiconductor chip to output the encoded debug code from the computing system.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

POST debug code or other code may be wirelessly output from a computing system in various forms, such as infrared, radio frequency, visible light, bar codes or others. The debug code may be broadcast by way of a legacy I/O port, such as I/O port 80, or other interfaces/addressing schemes. A non-booting computing system may be debugged wirelessly without having to resort first to gaining access to the internals of the device enclosure. Additional details will now be described.

Figure 1:
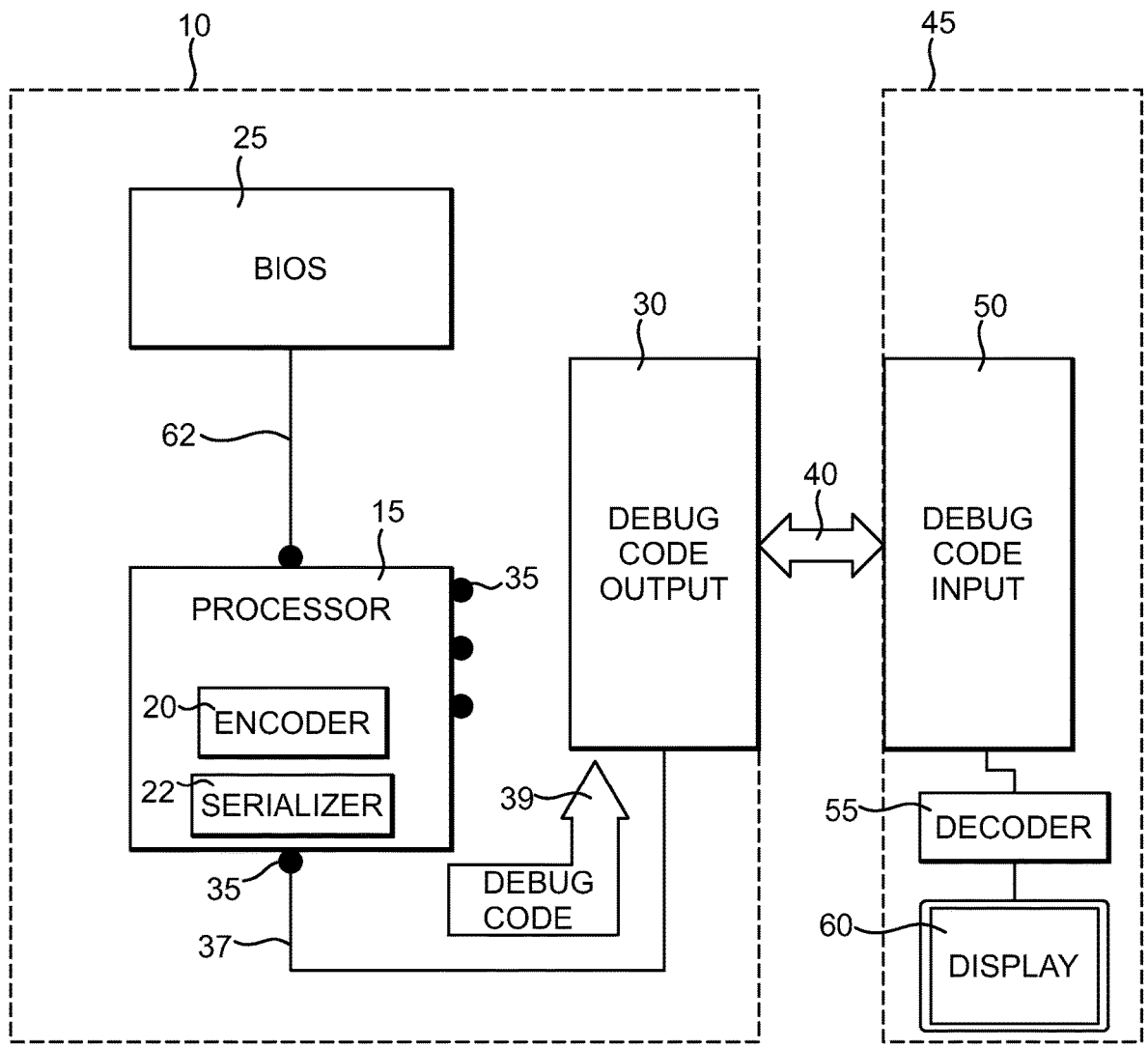
FIG. 1 is a schematic view of an exemplary embodiment of a computing system.

In the drawings described below, reference numerals are generally repeated where identical elements appear in more than one figure. Turning now to the drawings, and in particular to FIG. 1, therein is shown a schematic view of an exemplary embodiment of a computing system 10. The computing system 10 may be any of a great variety of computing systems such as, computers, appliances, avionics, communications devices, medical devices or other devices which utilize self-test routines at power up. The computing system 10 may include many different types of components, such as, for example, a semiconductor chip 15, an encoder 20, a serializer 22, a BIOS 25, a debug code output 30 and others. The semiconductor chip 15 may be any of a great variety of different types of integrated circuits. Examples include integrated circuits dedicated to video processing, central processing units (CPU), graphics processing units (GPU), accelerated processing units (APU) that combines microprocessor and graphics processor functions, a system-on-chip, application specific integrated circuits, memory devices, active optical devices, such as lasers, passive optical devices or the like. The semiconductor chip 15 includes logic operable to, among many tasks, execute start up self test code, such as POST code. The encoder 20 may be incorporated into the processor 15 or implemented as a separate integrated circuit or other device as desired. The function of the encoder 20 is to encode debug information that may then be transmitted via one of the I/Os 35 of the processor 15 to the debug code output 30. The serializer 22 is used to generate a serial data stream for delivery to the debug code output 30, and may be part of or separate from the encoder 20. Serialization of signals may be useful in embodiments that utilize a single electro-mechanical pin or other non-parallel type output pathway, such as the various wireless embodiments disclosed elsewhere herein. The semiconductor chip 15 may have large numbers of the I/Os 35 and these may be both general purpose I/Os and special purpose I/Os as desired. Furthermore, the I/Os 35 may utilize different types of physical interfaces with the computing system 10, such as pins, solder bumps, other types of leads or other interconnects as desired.

The BIOS 25 may be a non-volatile memory device, such as a ROM or other type of storage device. The semiconductor chip and the BIOS 25 may cooperate together during a power on self test or POST, where the semiconductor chip 15 executes code that may be resident on the BIOS 25. The POST code may be in the form of software, firmware, combinations of these or others. POST execution may involve a number of operations depending on the arrangement and complexity of the computing system 10 and the POST code. Examples of the POST operations for a computer include verification of processor registers, verification of the integrity of the BIOS code, verification of some basic components like timers, interrupt controllers, verification of system main memory, the initialization of the BIOS, the discovery, initialization, and cataloging of all system buses and devices, the provision of a user interface for system configuration and the identification, organization, the selection of which devices are available for booting, and the generation of debug information. The number and types of these operations will depend on the configuration of the computing system 10.

During POST, the semiconductor chip 15 and the encoder 20 generate encoded debugging information, preferably as a serial data stream, that is delivered on pathway 37 as debug code 39 to the debug code output 30. The debug code 39 includes information on the progress of the pre-booting process such as the progress of POST instructions. As described in more detail below, the debug code output 30 may take on a variety of different forms. Regardless of particular form, the debug code output 30 is operable by way of a transmission medium 40 to deliver the encoded debug code 39 to a sensing computing system 45, which may include a debug code input 50, a decoder 55 and an optional display device 60. The transmission medium 40 may be an electro-mechanical connection, optical light, infrared, radio frequency or others. The sensing computing system 45 may have a variety of configurations. Examples include a general purpose computer, a hand held computing system, a special purpose computing system or other device. The debug code input 50 is operable to receive the debug code 39, and like the debug code output 30, may take on a variety of different forms to be described below. The decoder 55 is operable to receive the debug code 39 from the debug code output 30 via the transmission medium 40 and the debug code input 50 and thereafter decode that debug code 39 and optionally render it for display to the user via the display device 60. In this way, the irregularities in the POST for the computing system 10 may be read out to the user without the need to fully boot the computing system 10. The decoder 55 may be implemented as hardware, software, firmware, combinations of these or other. It should be understood that the display 60 may be a monitor or other display device or even a blinking light on a keyboard or other user input device.

The POST sequence may vary depending on the configuration and complexity of the computing system 10. An exemplary example for the computing system 10 may be as follows. On power up, the semiconductor chip 15 may ask the BIOS 25 for POST code. This may be done directly via the connection 62, via an optional chip set (not shown) or via internal pathways in the event the BIOS is in the semiconductor chip 15. In any event, the semiconductor chip acquires or already has the address of the POST code in the BIOS and acquires that POST code. The semiconductor chip 15 then executes the acquired POST code and performs the POST operations discussed above. Part of the POST operations includes the semiconductor chip 15 broadcasting the debug code 39.

The debug code 39 may take on a variety of forms. In an exemplary embodiment, the debug code 39 may be output on I/O Port 80 or some other I/O port as desired. I/O Port 80 is an addressing scheme whereby a message that includes a message header and a message body may be broadcast to various parts of the computing system 10, including the debug code output 30. For example, the debug code 39 might indicate the last POST instruction completed or some other fashion the progress of the start up. If the computing system 10 will not boot, this last executed instruction will help identify the problem area(s) that prevented system boot. A variety of encoding schemes may be used by the encoder 20 to encode the debug code 39. A non-exhaustive list includes Manchester encoding, phase shift keying, 8B/10B or others.

Figure 2:
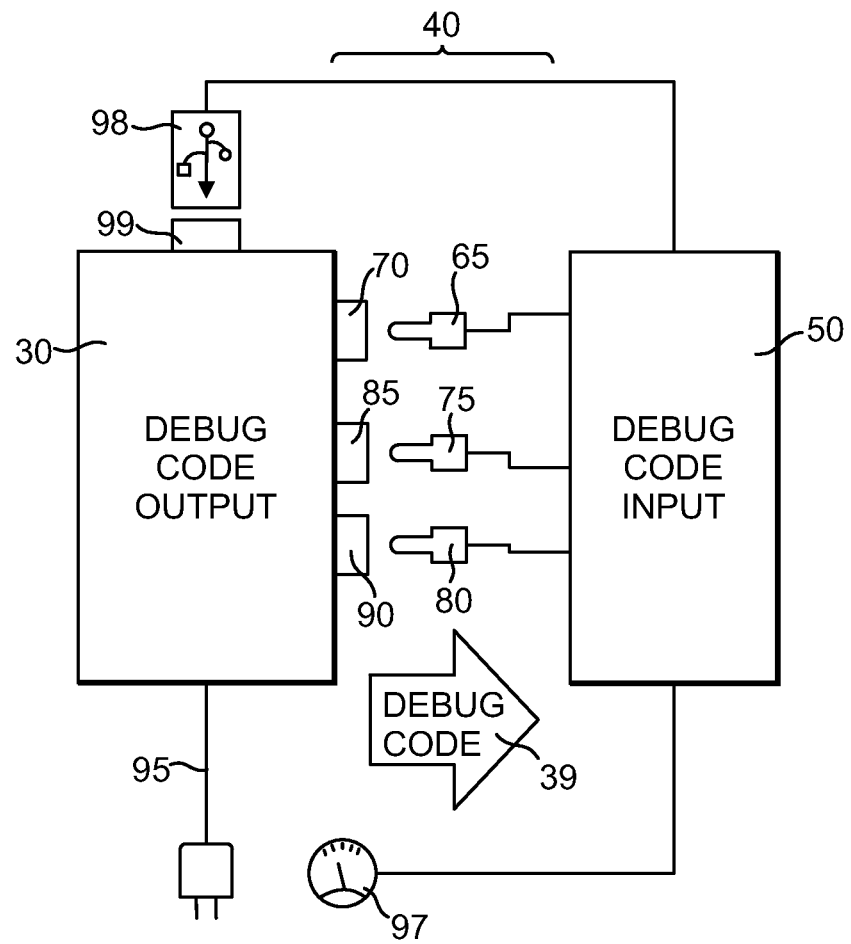
FIG. 2 is a schematic view of an exemplary debug code output and input.

A few exemplary embodiments of the debug code output 30, the transmission medium 40 and the debug code input 50 depicted in FIG. 1 may be understood in more detail by referring now to FIG. 2, which is a schematic view. Here, the transmission medium 40 may take on several examples. One exemplary embodiment involves a single mechanical pin 65 connected to the debug code input 50 and operable to selectively contact a contact terminal 70 that is part of or otherwise connected to the debug code output 30. The pin 65 may be a pogo pin or other type of contact pin. This combination of the single mechanical pin 65 and the contact terminal 70 provides a simple method of temporarily providing a pathway to the debug code input 50 to receive the debug code 39. Optionally, a multiple mechanical pin arrangement may be used involving mechanical pins 75 and 80 that are operable to contact terminal 85 and a ground terminal 90. The pins 75 and 80 may be pogo or other types of contact pins. Utilizing two pins increases the complexity of the arrangement, but the addition of a ground path may reduce the impacts noise that may be more prevalent in a single pin arrangement involving the pin 65 and the terminal 70. More than two pins could also be used. In yet another variation depicted in FIG. 2, the debug code input 50 may connect or otherwise sense debug code 39 as a current or as variations in current on an DC power input 95 to the debug code output. In this case the DC power input 95 may be sensed by the debug code input by way of a current clamp 97 or other current sensor and those signals may be decoded by way of the decoder 55 and displayed as necessary by the display 60 shown in FIG. 1. In still another exemplary embodiment, the debug code input 50 may connect to the debug code output 30 by way of a universal serial bus (USB) port connector 98 connected to the debug code input 50 and a USB port 99 that is part of or otherwise connected to the debug code output 30. The USB connector 98 and USB port 99 may be USB 1.0, 2.0, 3.0, 3.1 or other USB standards.

Figure 3:
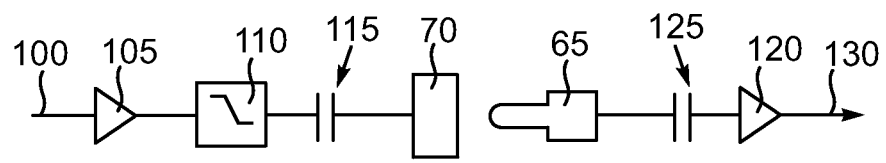
FIG. 3 is a schematic view of an exemplary circuit pathway for one of the electro-mechanical pin interface connections of the debug code output and input depicted in FIG. 2.

An exemplary circuit for the pathway associated with the pin 65 and the contact terminal 70 shown in FIG. 2 is represented schematically in FIG. 3. Here, the input 100 is the output of the debug code output 30 depicted in FIG. 2. Before being delivered to the contact terminal 70, the input 100 may be transmitted through a buffer 105, a low pass filter 110 and finally across a capacitor 115. The capacitor 115 is used for AC coupling purposes. The output of the pin 65 may be capacitively coupled to an output buffer 120 by way of a capacitor 125. The output 130 of the buffer 120 may be provided to the decoder 55 shown in FIG. 1 and ultimately to the display 60 as necessary.

In the foregoing illustrative embodiments shown in FIGS. 2 and 3, electrical-mechanical or hard wired transmission media 40 of one form or another is utilized for the transmission of debug code 39 from the debug code output 30 to the debug code input 50. However, the skilled artisan will appreciate that other transmission media may be utilized. In this regard, attention is now turned to FIG. 4, which is a schematic view of an alternate exemplary embodiment of the debug code output 30' and the debug code input 50'. Here, the transmission media collectively labeled 40' may take on a variety of different configurations. For example, the debug code output 30' may include an infrared transmitter 135 that is operable to deliver the debug code 39 in the form of encoded infrared signals 140 by way of a window 145 in an enclosure 150 associated with the computing system 10. The infrared signal 140 may be read by a suitable infrared sensor 155 of the debug code input 50'. The window 145 may be a dedicated physical window in the enclosure 150 or be some existing opening in the enclosure 150 such as an exhaust or intake vent. In addition, the debug code output 40' may drive either a 2D or 3D bar code display screen 160 to convey the debug code 38. The display screen 160 may be read by a suitable bar code reader 165 on the debug code input 50'. In still another variation, the debug code output 30' may include a RF modulated transmitter 170 that is operable to deliver the debug code 39 in the form of encoded RF radiation 175 that may be detected by a suitable RF receiver 180 of the debug code input 50'. As described more fully below, the RF transmitter 170 may be AM or FM modulated. In still another variation, the debug code output 30' may be connected to a user input device, such as a keyboard 185, which may incorporate one or more blinking lights such as LEDs or other types of lights 190. The debug code output 30' may cause the lights 190 to blink appropriately to deliver the debug code 39. The encoded light signals from the lights 190 may be read by an appropriate optical sensor 195 of the debug code input 50'. The various embodiments depicted in FIG. 4 may be implemented at a system board or card level.

Figure 4:
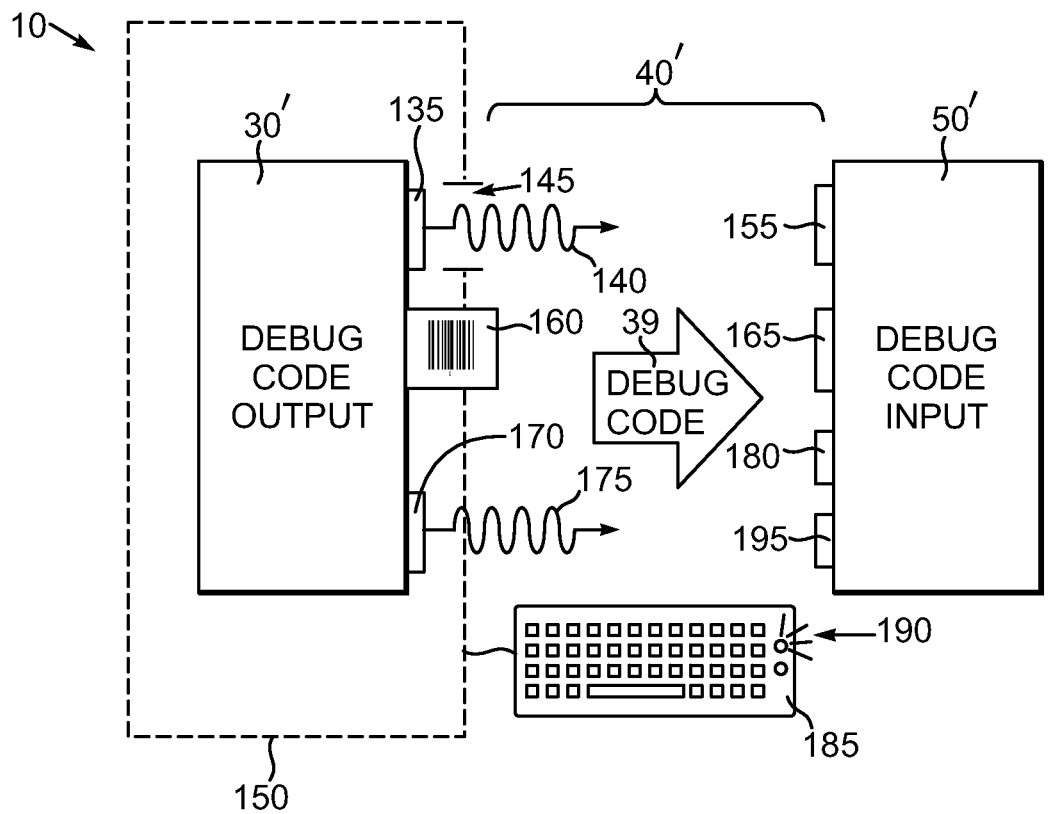
FIG. 4 is a schematic view of an alternate exemplary debug code output and input system that utilizes wireless outputting of debug code information.
Figure 5:
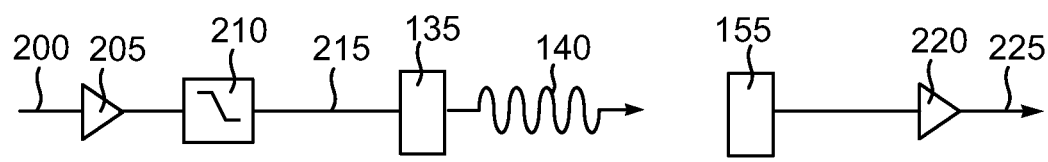
FIG. 5 is a schematic view of an exemplary circuit for transmitting infrared debug code.

Some additional details of the exemplary infrared transmission scheme to deliver the encoded infrared radiation 140 may be understood by referring now also to FIG. 5, which is a schematic view. The debug code output 30' in FIG. 4 delivers an encoded input 200 to a buffer 205. The output of the buffer 205 is passed through a low pass filter 210. The output of the low pass filter 215 is delivered to the transmitter 135. The encoded IR radiation 140 is received by the receiver 155. The output of the receiver 155 is delivered to a buffer 220. The output 225 of the buffer 220 is delivered to the decoder 55 depicted in FIG. 1. The receiver 155 may be a photo diode or other optical or infrared sensor.

Figure 6:
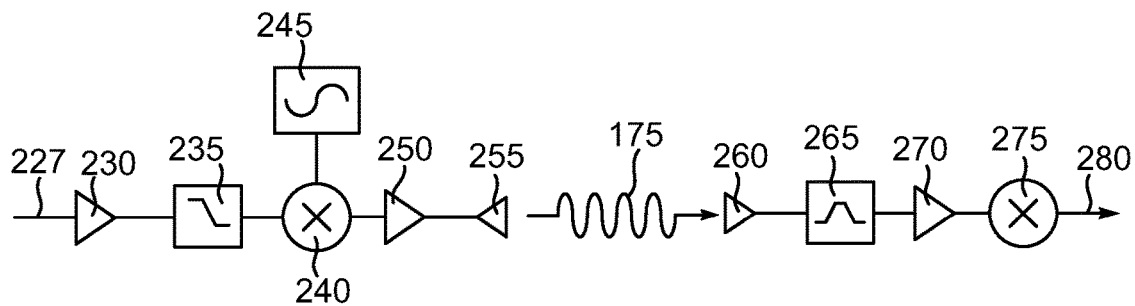
FIG. 6 is a schematic view of an exemplary circuit pathway to deliver radio frequency debug code information.

An exemplary circuit for the RF transmitter 170 depicted in FIG. 4 may be understood by referring now also to FIG. 6. An encoded input 227 from the debug code output 30' shown in FIG. 4 is delivered to a buffer 230. The output of the buffer 230 is passed through a low pass filter 235. The output of the low pass filter 235 is delivered to a modulator 240, which may be a FM modulator that is connected to an oscillator 245. The output of the modulator 240 is passed through another buffer 250 and from there to an antenna 255, which transmits the RF radiation 175. On the receiver side, an antennae 260 receives the modulated RF radiation 175. The output of the antenna 260 is passed through a band pass filter 265. The output of the band pass filter 265 is delivered to an amplifier 270. The amplifier may be a field effect transistor type or other type of power amp. The output of the amplifier 270 is passed through a demodulator 275, which may be a FM or AM demodulator as desired. The output 280 of the demodulator 275 is delivered to the decoder 55 shown in FIG. 1.

The debug code output and transmission systems may be incorporated onto a semiconductor die as opposed to a board level implementation. In this regard, attention is now turned to FIG. 7, which is a schematic view depicting an alternate exemplary semiconductor chip 15". The semiconductor chip 15" includes the encoder 20 and an alternate exemplary decode output 30". The semiconductor chip 15" may be placed in the enclosure 150 and the debug code output 30" may include an IR transmitter 135 operable to deliver encoded IR radiation 140 that may be used to transmit the debug code 39. The IR radiation 140 may pass through the window 145 in the enclosure and be sensed by the IR receiver 155 of the debug code input 50'. In addition, the debug code output 30" may include a RF modulated transmitter 170 operable to deliver the RF modulated radiation 175 that may be sensed by the RF receiver 180. The debug code input 50' may or may not include the aforementioned bar code reader 165 and the visible light sensor 195 described above. The enclosure 150 may include the aforementioned window or other opening 145.

Figure 7:
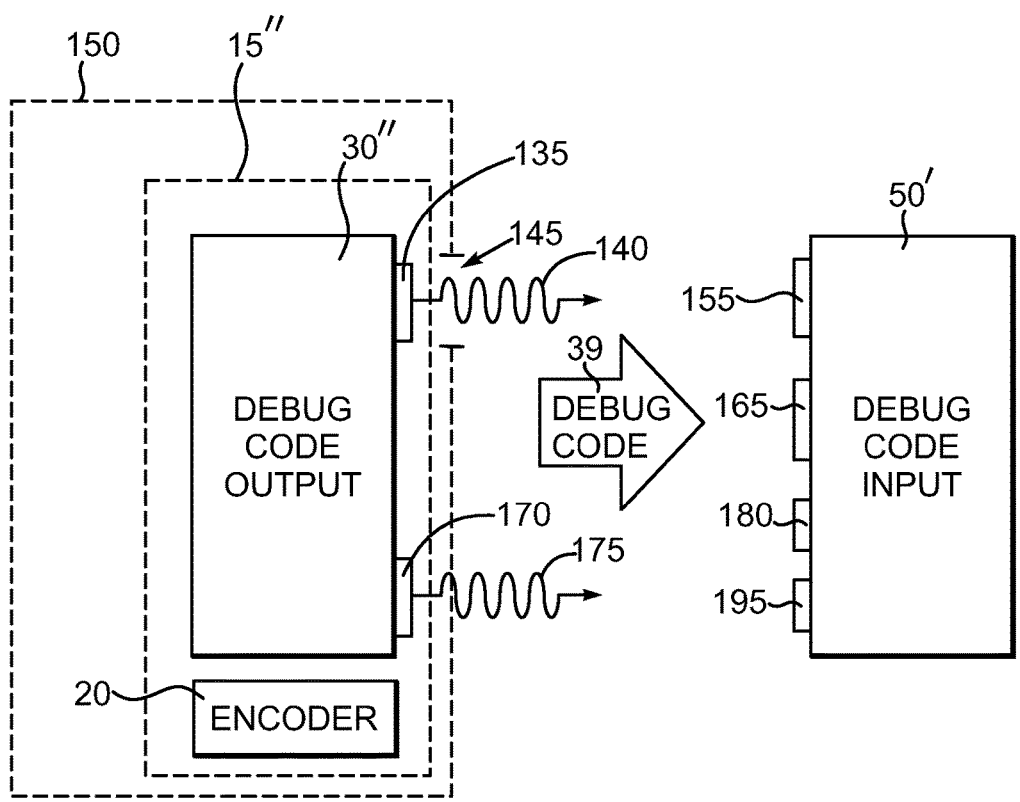
FIG. 7 is a schematic view depicting an exemplary chip based debug code output for wireless debug code output.
Figure 8:
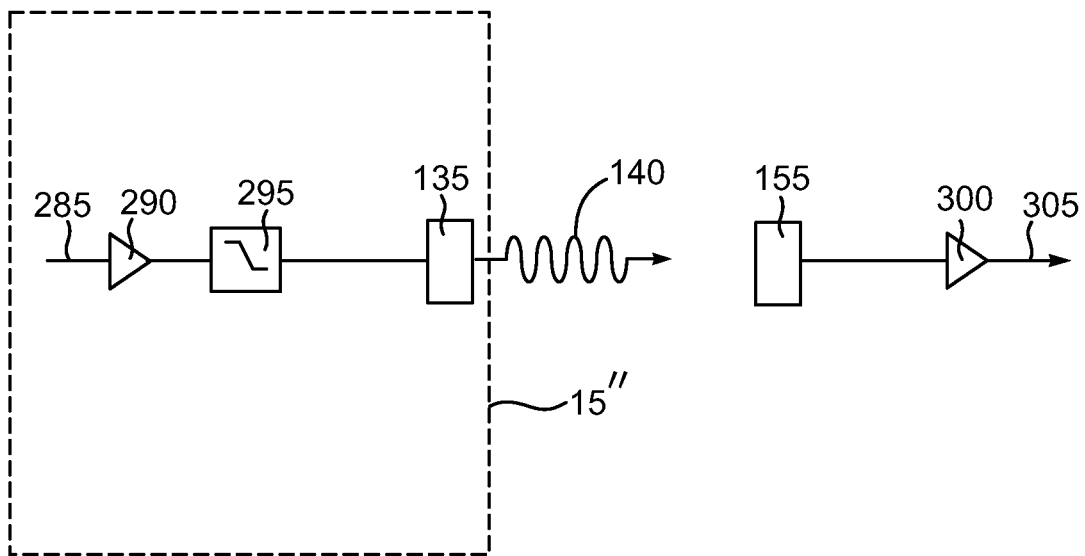
FIG. 8 is a schematic depiction of an exemplary chip based circuit pathway to deliver IR frequency debug code information.

An exemplary circuit associated with the semiconductor chip 15" to deliver the encoded IR signal 140 may be understood by referring now to FIG. 8, which is a schematic view. Here, the semiconductor chip 15" may include the IR transmitter 135 operable to deliver the encoded IR signal 140. An encodes signal input 285 from the encoder 20 shown in FIG. 7 is delivered to a buffer 290. The output of the buffer 290 is sent to a low pass filter 295. The input 285 to the transmitter 135 may be the output of a low pass filter 290 which is connected to a buffer 295 and the buffer 295 connected to other portions of the chip 15". The transmitter 135 may be an IR LED or other type of IR transmitter. The signal 140 may be received by the IR receiver 155 and delivered to a buffer 300. The output 305 of the buffer and the output of the buffer 300 may be delivered elsewhere in the debug code input 50' shown in FIG. 7.

Figure 9:
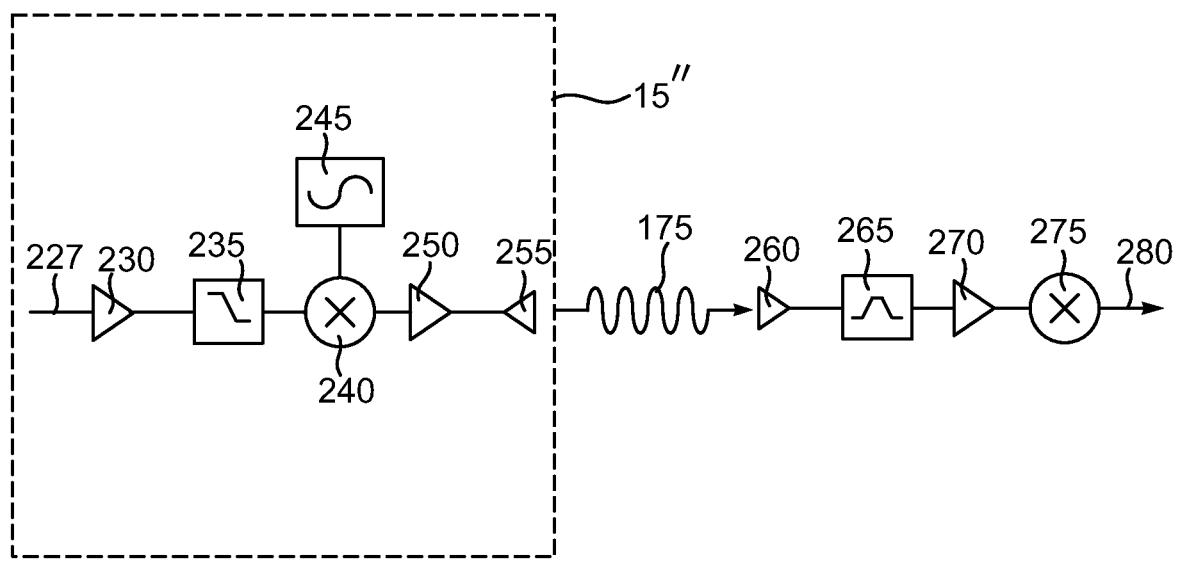
FIG. 9 is a schematic view depicting an exemplary circuit pathway for a chip based radio frequency transmission of debug code information.

An exemplary circuit implementation for a chip-based RF modulator embodiment may be understood by referring now to FIG. 9, which is a schematic view. Here, the semiconductor chip 15" may include the circuit elements generally depicted in FIG. 6. An encoded input 227 from the debug code output 30' shown in FIG. 4 is delivered to a buffer 230. The output of the buffer 230 is passed through a low pass filter 235. The output of the low pass filter 235 is delivered to a modulator 240, which may be a FM modulator that is connected to an oscillator 245. The output of the modulator 240 is passed through another buffer 250 and from there to an antenna 255, which transmits the RF radiation 175. The antenna 255 may be a dedicated antenna formed into the semiconductor substrate of the chip 15" or be implemented as an antenna coupled to an existing conductor trace (not shown) of the chip 15". On the receiver side, an antennae 260 receives the modulated RF radiation 175. The output of the antenna 260 is passed through a band pass filter 265. The output of the band pass filter 265 is delivered to an amplifier 270. The amplifier may be a field effect transistor type or other type of power amp. The output of the amplifier 270 is passed through a demodulator 275, which may be a FM or AM demodulator as desired. The output 280 of the demodulator 275 is delivered to the decoder 55 shown in FIG. 1.

It may also be possible to use a broad spectrum generator modulated serial data stream. In this embodiment, a spread spectrum generator selectively turns a spread spectrum clock on and off or up/downspread to modulate the signal output. On the receiver side, a spectrum analyzer and FM demodulator handle the received data stream signals.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computing system, comprising:
a semiconductor chip operable to execute start up self test code prior to system boot;
an encoder operable to encode the progress of the execution of the start up self test code to generate encoded debug code; and
means for wirelessly outputting the encoded debug code from the computing system prior to system boot.

2. The computing system of claim 1, wherein the encoder is part of the semiconductor chip.

3. The computing system of claim 1, wherein the encoder is discrete from the semiconductor chip.

4. The computing system of claim 1, wherein the means for wirelessly outputting is part of the semiconductor chip.

5. The computing system of claim 1, wherein the means for wirelessly outputting is discrete from the semiconductor chip.

6. The computing system of claim 1, wherein the means for wirelessly outputting comprises an infrared, a radio frequency or visible wavelength transmitter.

7. The computing system of claim 1, wherein the means for wirelessly outputting comprises a bar code display.

8. The computing system of claim 1, comprising a receiver to receive the outputted encoded debug code and decode the encoded debug code.

9. The computing system of claim 8, wherein the receiver includes a human readable display.

10. A semiconductor chip, comprising:
logic operable to execute start up self test code prior to boot of a system in which the semiconductor chip is adapted to run;
an encoder operable to encode the progress of the execution of the start up self test code to generate encoded debug code; and
a transmitter for wirelessly outputting the encoded debug code from the semiconductor chip prior to boot of the system.

11. The semiconductor chip of claim 10, wherein the transmitter comprises an infrared, a radio frequency or visible wavelength transmitter.

12. A method of conveying start up self test debug code from a computing system having a semiconductor chip, comprising:
using a semiconductor chip of the computing system to execute the start up self test code prior to system boot;
encoding the progress of the execution of the start up self test code to generate encoded debug code; and
wirelessly outputting the encoded debug code from the computing system prior to system boot.

13. The method of claim 12, comprising using the semiconductor chip to perform the encoding.

14. The method of claim 12, comprising using another device to perform the encoding.

15. The method of claim 12, comprising using the semiconductor chip to wirelessly output the encoded debug code.

16. The method of claim 12, comprising using another device to wirelessly output the encoded debug code.

17. The method of claim 12, comprising wirelessly outputting in infrared, radio frequency or visible wavelengths.

18. The method of claim 12, wherein the wirelessly outputting comprises displaying the encoded debug code on a bar code display.

19. The method of claim 12, comprising receiving the outputted encoded debug code and decoding the encoded debug code.

20. The method of claim 19, comprising displaying the decoded debug code on a human readable display.

21. A computing system, comprising:
a semiconductor chip operable to execute start up self test code prior to system boot;
an encoder operable to encode the progress of the execution of the start up self test code to generate encoded debug code; and
a USB port connected to the semiconductor chip to output the encoded debug code from the computing system prior to system boot.

* * * * *